US007124220B2

(12) United States Patent
James, Jr. et al.

(10) Patent No.: US 7,124,220 B2
(45) Date of Patent: Oct. 17, 2006

(54) SEQUENCER DEVICE WITH AUTOMATED ACTIVE PORT DETECTION AND SEQUENCING

(75) Inventors: Benjamin James, Jr., Oakland, CA (US); Tom Eckler, West Granby, CT (US); Nicholas Christopher Cravotta, Berkeley, CA (US)

(73) Assignee: Funhouse Productions, Oakland, CA (US)

( * ) Notice: Subject to any disclaimer, the term of this patent is extended or adjusted under 35 U.S.C. 154(b) by 54 days.

(21) Appl. No.: 09/938,472

(22) Filed: Aug. 23, 2001

(65) Prior Publication Data

US 2002/0130787 A1 Sep. 19, 2002

Related U.S. Application Data

(60) Provisional application No. 60/227,944, filed on Aug. 25, 2000.

(51) Int. Cl.
*G06F 13/00* (2006.01)

(52) U.S. Cl. ....................................... 710/104; 340/3.2

(58) Field of Classification Search .............. 710/8–15, 710/18–19, 301, 302; 315/185 R, 185 S, 315/193, 169.3; 340/3.1, 3.2, 3.3–3.32, 825.65
See application file for complete search history.

(56) References Cited

U.S. PATENT DOCUMENTS

| | | | | |
|---|---|---|---|---|
| 4,365,245 | A * | 12/1982 | Colmenero | 345/1.3 |
| 4,396,868 | A * | 8/1983 | Watanabe et al. | 315/130 |
| 5,404,524 | A * | 4/1995 | Celi, Jr. | 713/2 |
| 5,764,141 | A * | 6/1998 | Chang | 340/472 |
| 5,884,086 | A * | 3/1999 | Amoni et al. | 713/300 |
| 5,920,266 | A * | 7/1999 | Allgood et al. | 710/300 |
| 5,957,564 | A * | 9/1999 | Bruce et al. | 362/84 |
| 6,515,434 | B1 * | 2/2003 | Biebl | 315/291 |
| 6,653,797 | B1 * | 11/2003 | Puleo et al. | 315/185 S |
| 6,675,243 | B1 * | 1/2004 | Bastiani et al. | 710/105 |
| 6,697,372 | B1 * | 2/2004 | McAlear | 370/402 |

OTHER PUBLICATIONS

Tanenbaum, Andrew S., Structured Computer Organization, Prentice-Hall, New Jersey, 1990, pp. 11-13.*

* cited by examiner

*Primary Examiner*—Rehana Perveen
*Assistant Examiner*—Clifford Knoll
(74) *Attorney, Agent, or Firm*—Dean E. Wolf, Esq.

(57) ABSTRACT

The technique is disclosed for detecting active ports of an electronic device. The electronic device comprises a plurality of ports, including a first port. A determination is automatically performed as to whether an external component is connected to the first port. The first port is identified as an active port in response to a determination that an external component is connected to the first port. If there no external component is connected to the first port, then the first port is identified as an inactive port. The inactive and active ports may then be distinguished and treated differently during subsequent control and/or management of the plurality of ports. According different implementations the first port may be identified as an active port in response to detection of a capacitive, resistive, and/or inductive load connected to the first port. The first port as may also be identified an active port in response to a determination that a current is flowing through the first port.

38 Claims, 7 Drawing Sheets

SEQUENCER DEVICE WITH AUTOMATED ACTIVE PORT DETECTION AND SEQUENCING

RELATED APPLICATION DATA

The present application claims priority under 35 U.S.C. § 119 to U.S. Provisional Application Ser. No. 60/227,944, naming James et al. as inventors, and filed Aug. 25, 2000, the entirety of which is incorporated herein by reference in its entirety for all purposes.

BACKGROUND OF THE INVENTION

The present invention is related generally to sequencing devices, and more particularly to the sequencing technique with automated active port detection and sequencing.

Conventionally, sequencing circuits typically include a relatively small number of ports (e.g. 1–5 ports) for sequencing attached wires according to a predefined sequence. If more wires are needed to be sequenced, then two or more conventional sequencing units may be serially combined to produce a system which is able sequence the desired number of wires. For this reason, conventional sequencers having a relatively large number of sequencing ports (e.g. more than 5) are uncommon, since is it cheaper to combine a few smaller sequencing units than to manufacture a large sequencing unit.

One problem with conventional sequencing units is that they are not able to perform automatic wire detection. Without wire-detection, the device controlling the wires would produce "blanks" in the patterns, or points in the sequence where no wires are connected, when the sequencer attempts to turn on those wires. Another problem with conventional sequencing devices relates to zero-crossing issues, as described in greater detail in the Detailed Description Section of this application.

Accordingly, it will be appreciated that there exists a present need to improve upon conventional sequencing device designs in order to provide improved features and advantages.

SUMMARY OF THE INVENTION

According to various embodiment the present invention, methods, systems, and computer program products are disclosed for detecting active ports of an electronic device. The electronic device comprises a plurality of ports, including a first port. A determination is automatically performed as to whether an external component is connected to the first port. The first port is identified as an active port in response to a determination that an external component is connected to the first port. If there no external component is connected to the first port, then the first port is identified as an inactive port. The inactive and active ports may then be distinguished and treated differently during subsequent control and/or management of the plurality of ports. According to one implementation the first port may be identified as an active port in response to detection of a capacitive load connected to the first port. In a different implementation, the first port may be identified as an active port in response to detection of a resistive load connected to the first port. In an alternate implementation, the first port as may be identified an active port in response to a determination that an inductive load is connected to the first port. In yet another implementation, the first port as may be identified an active port in response to a determination that a current is flowing through the first port.

Alternate embodiments of the present invention are directed to various methods, systems, and computer program products for sequencing selected ports of an electronic device which includes a first port and a second port. Active ports of the electronic device are automatically identified. According to a specific embodiment, an active port may be characterized as a port which has an external load physically connected to it. Sequencing of only desired, active ports of the electronic device may then be implemented.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
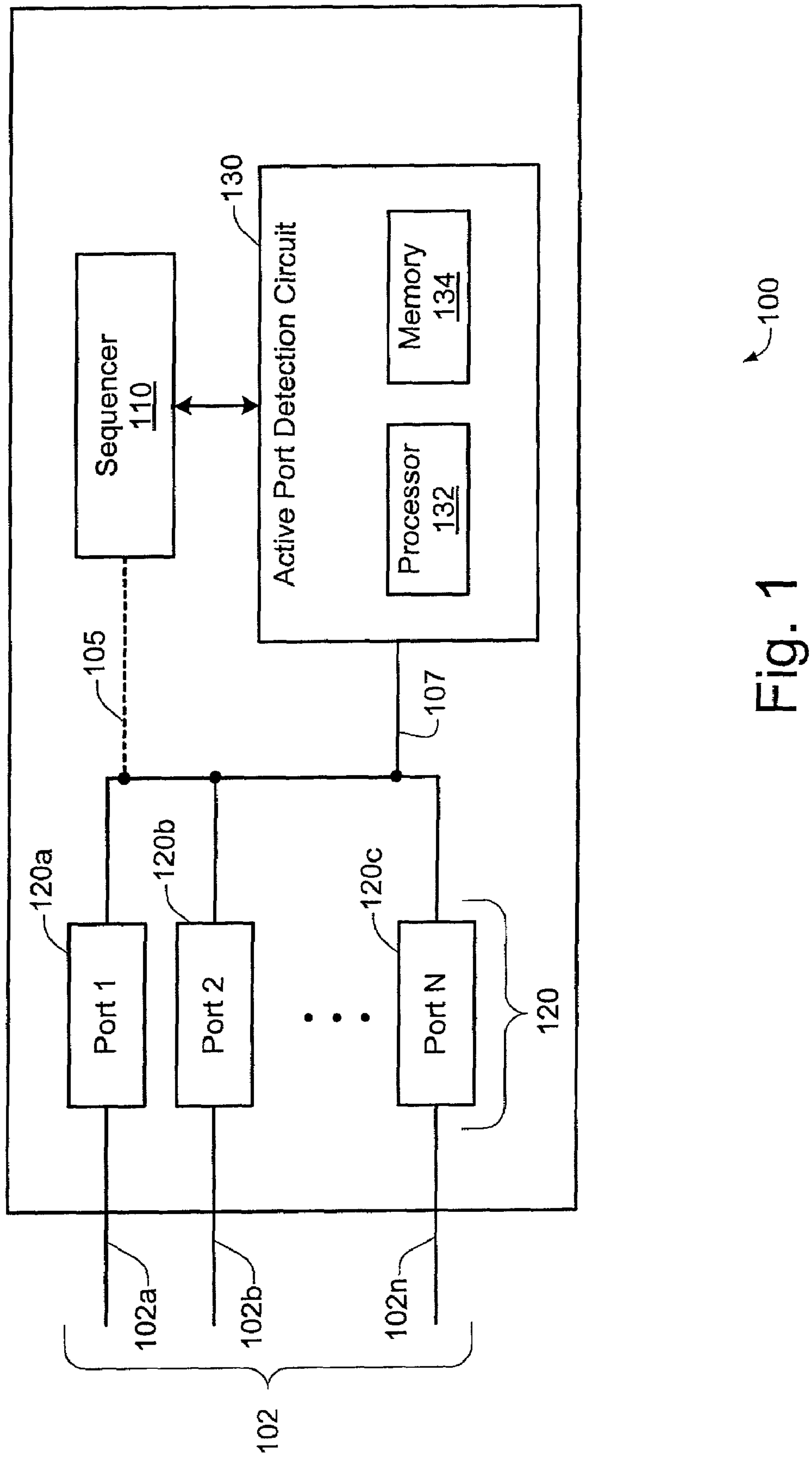
FIG. 1 shows a block diagram of a sequencing device 100 in accordance with a specific embodiment of the present invention.

FIG. 1 shows a block diagram of a sequencing device 100 in accordance with a specific embodiment of the present invention. As shown in the embodiment of FIG. 1, the sequencing device 100 includes a plurality of ports 102, a sequencer 110, and an active port detection circuit 130. In a specific implementation, the active port detection circuit 130 may include a processing device 132 (e.g. a CPU, EEPROM, AISIC, etc.) and memory 134. As explained in greater detail below, the sequencing device 100 may be configured or designed to automatically detect the presence of one or more wires connected to one or more of the of the ports 102. Once the sequencing device has determined the specific ports which are active (e.g. ports which have wires connected to them), the sequencing device may then sequence each of the active ports, in a particular order without attempting to include inactive ports in the sequence. According to one implementation, the active port detection circuit 130 may be responsible for sequencing each of the active ports. In an alternate embodiment, the sequencer 110 may sequence the active ports using information provided by the active port detection circuit 130.

According to specific embodiments, the technique of the present invention provides a number of advantages and/or features which are not provided by conventional sequencing devices. For example, the sequencing technique of the present invention may be used to provide automatic wire detection of wires attached to a sequencing unit. Because of this feature, a generic sequencing unit may be manufactured to have a relatively large number of ports (e.g. 5–10 or more ports), and the automatic wire detection feature may then be used to automatically detect and sequence only active ports (e.g. only those ports on the unit where a wire or circuit is physically connected).

According to a specific embodiment, and active port detection (APD) device of the present invention may be configured or designed to detect the presence of devices or elements which are physically connected to ports of the APD device. According to a specific implementation, the detection of the presence of an element, component, or device connected to a given port may be based upon detection of a capacitive load connected to the port. Alternatively, the detection of the presence of an element, component, or device connected to a given port may be based upon detection of a resistive load connected to the port. In another implementation, the detection of the presence of an element, component, or device connected to a given port may be based upon detection of current flowing through the port.

The APD device may be configured to detect the presence or absence of devices/elements connected to its ports upon power up (or reset). Thereafter, once the active ports have been identified, the APD device may be configured to control only the identified active ports. Empty or no-active ports may be selectively omitted from being controlled by the APD device. In a specific embodiment, the APD device corresponds to a sequencing device which may be configured or designed to sequence only active ports on the sequencing device. However, the technique of the present invention may be applied to applications other than sequencing operations. For example, a device which is configured to implement the active port detection technique of the present invention may be provided to allow a user to connect desired wires and/or circuits to one or more ports on the device, and the device may then automatically determine the active ports on the device, and use this information when performing future operations.

According to a specific embodiment, the APD device may be configured or designed to automatically detect the presence of elements which are physically connected to ports of the APD device, even when such elements do not form a closed circuit. For example, using the technique of the present invention, an open wire that is connected to a specific port of the APD device may be detected and the corresponding port identified as being an active port. According to a specific implementation, the determination as to whether a selected port is active or inactive may be achieved by detecting for the presence of a capacitive load connected to that port. This technique is particularly useful in situations where the port is connected to an open circuit such as, for example, a length of electroluminescent wire. Alternatively, according to an alternate implementation, the determination as to whether a selected port is active or inactive may be achieved by detecting for the presence of a resistive load connected to that port. This technique is useful in situations where the port is connected to a closed circuit, as, for example, a light emitting diode (L.E.D). According to yet another implementation, the determination as to whether a selected port is active or inactive may be achieved by detecting for the presence of a current flowing through that port.

It will be appreciated that, without the active port detection feature of the present invention, for example, a controller may attempt to control blank or empty ports, or may not differentiate between active ports and non-active ports. For example, in the case of a sequence of devices, empty ports would be included in the sequencing of the ports, thereby resulting visually in "blanks" in the sequencing pattern.

According to a specific implementation, the APD device may be configured or designed such that no configuration is required by the user of the invention, other than the user plugging devices/elements into ports on the APD device. The APD device will automatically detect the appropriate active ports. No jumpers or switches need be used to tell the APD device which ports have devices/elements connected to them. In an alternate implementation, the user may at appropriate configuration information such as, for example, the sequencing order of the active ports. Thus, for example, using the technique of the present invention, the APD device may automatically configure itself to be a 2-channel sequencer when 2 elements/devices are connected to ports on the APD device, a 3-channel sequencer when 3 elements/devices are connected to ports on the APD device, etc.

Additionally, according to one implementation, logically consecutive active ports on the APD device need not be physically consecutive in terms of the order of servicing each active port. For example, six devices/elements could be connected to a 10-port APD device using any combination of six of the 10 ports. In this example, using the technique of a present invention, the physical sequencing of ports: P0, P3, P5, P6, P8, P9, for example, may be assigned a logical sequence of: Device 0,–Device 5.)

Additionally, if ports two and three were physically damaged, the user could connect devices to any of the eight remaining ports to produce a "logically" consecutive sequence of the active ports. Thus, unlike conventional techniques, physically damaged ports do not produce "blanks" in sequences. Moreover, the user can use another connector if a connector (port) aboard the APD device is physically damaged (i.e., pins are broken, electrical continuity to port is broken).

Figure 2A:
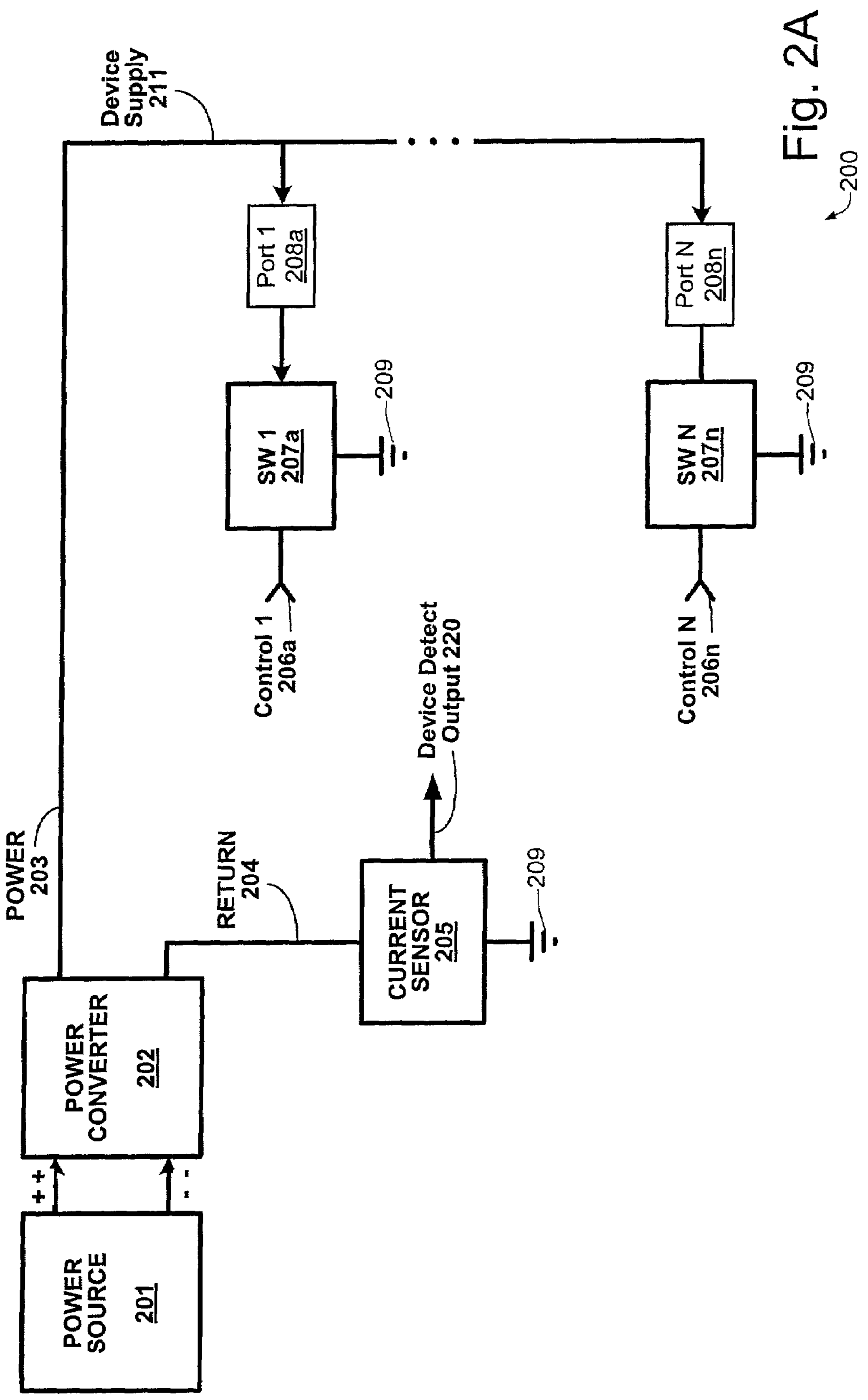
FIGS. 2A and 2B shows a block diagrams of active port detection (APD) devices which have been implemented in accordance with specific embodiments of the present invention.

FIG. 2A shows a block diagram of an APD device 200 which has been implemented in accordance with a specific embodiment of the present invention. It will be appreciated that the APD device of FIG. 2A may be modified by one having ordinary skill in the art to include additional or fewer components than those illustrated in FIG. 2A.

Referring now to the APD device 200 of FIG. 2A, a power source (201) supplies power to a power converter (202) which converts the power from the power source to a voltage, current, and frequency sufficient to supply a load connected to a port (e.g. port 208*a*) of the circuit with power appropriate to cause this load to function (e.g., power appropriate to cause an L.E.D. to illuminate, power appropriate to cause and electroluminescent wire to light up, etc). In the embodiment of FIG. 2A, the load may correspond to a particular device, complement, or element, such as, for example, an electroluminescent wire or an L.E.D.

According to a specific embodiment, each port of the APD device may include one or more input slots or receptacles for receiving connections to external devices, complements, and/or elements.

As shown in FIG. 2A, one or more switching devices 207 (e.g. 207*a*, 207*n*) may be provided in order to individually control the flow of power and/or current two selected ports. For example, in a specific implementation, a separate switching device may be provided for each respective port of the APD device. Control of each of the switching devices may be accomplished via respective control lines 206 (e.g. control line 206*a*, 206*n*) using one or more control signals. According to a specific embodiment, the control signals may be provided, for example, by the Active Port Detection Circuit 130 or the sequencer 110 of FIG. 1.

According to a specific implementation, when a load is connected to one of the ports (e.g. port 208*a*), a current may flow from power source (203) through a switch (207*a*) to ground (209) and back through the Current Sensor (205), then back to the RETURN (204) of the power converter. When this current is flowing, the Active-Port Detect Output (220) may output a signal indicating that a device is connected to port 208*a*.

According to a specific embodiment, the testing of each port as either an active or inactive port may be accomplished in a serial manner, wherein power is provided to each port, one port at a time. For example, in one implementation, a "turn-on" control signal may be applied to (via control lines 206) each switch (207), one switch at a time. A circuit (e.g. he Active Port Detection Circuit 130, FIG. 1) reading the Active-Port Detect Output (220) may then determine if a device is connected to the port associated with the currently selected switch. In one implementation, the circuit reading the Active-Port Detect Output (220) may correlate the "turn-on" signal with the Active-Port Detect Output (220) in order to make a map (e.g. Table 500 of FIG. 5) of the ports to which devices are connected. Using this map, the circuit can commence to control only those ports connected to devices and ignore ports which have no device connected to them.

One advantage of detecting the presence of a device connected to a port using a current path (e.g. 204) to the power converter (202) common to all ports is that only one active-port detector circuit is needed to detect a device connected to any ports of the circuit 200.

Figure 2B:
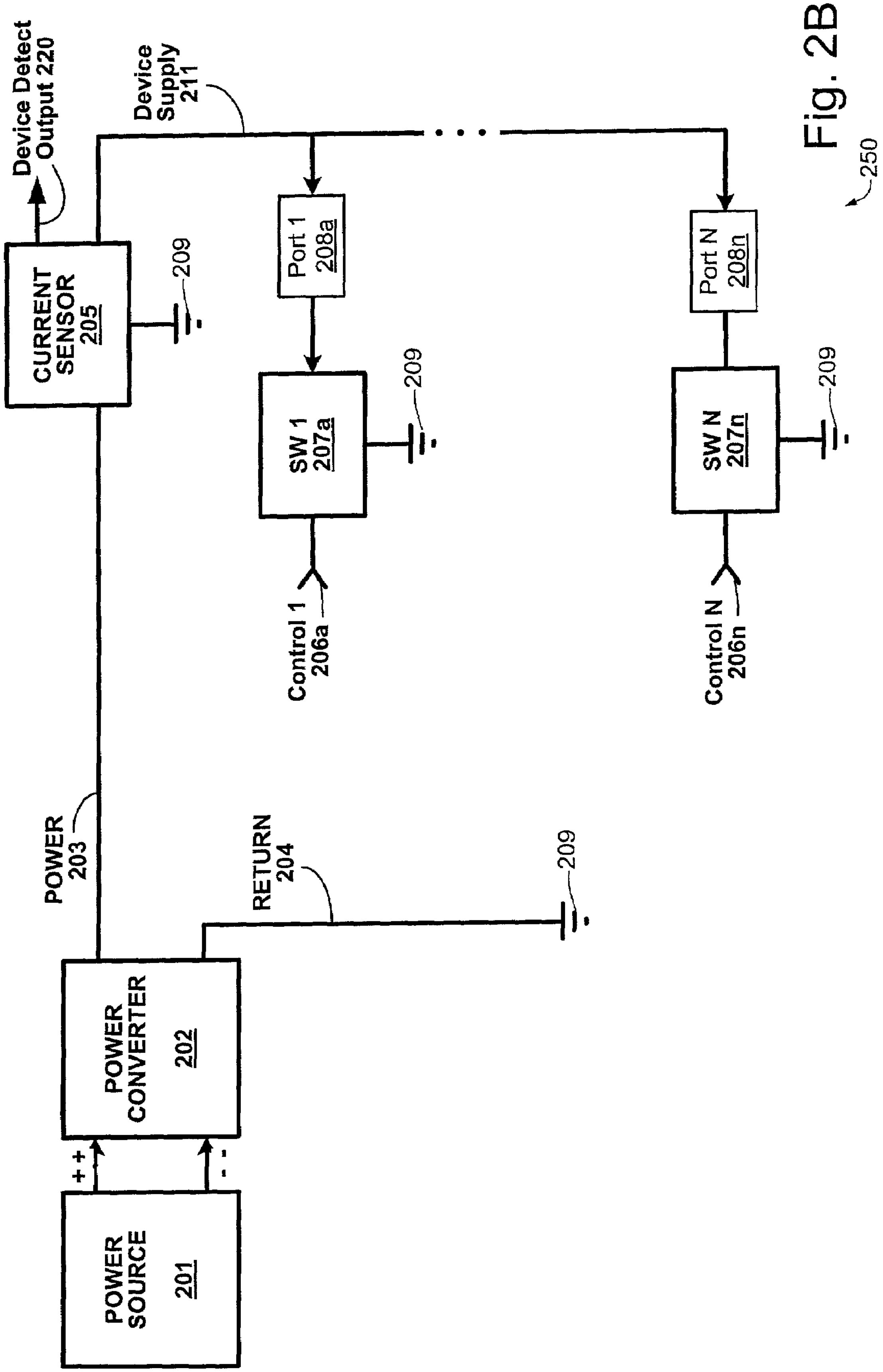

In one embodiment (as shown, for example, in FIG. 2A), the Current Sensor (205) is placed between RETURN (204) and ground (209). In another embodiment (as shown, for example, in FIG. 2B), the Current Sensor (205) is placed between POWER (203) and DEVICE SUPPLY (211). The specific embodiment to be used may be determined by the devices used to perform current-detection. In the embodiments of FIGS. 2A and 2B, each of the APD devices has being configured to utilize a current-detection technique to detect the presence of current flowing from the Power Converter (202) to one or more of the devices connected to ports 208.

Figure 3:
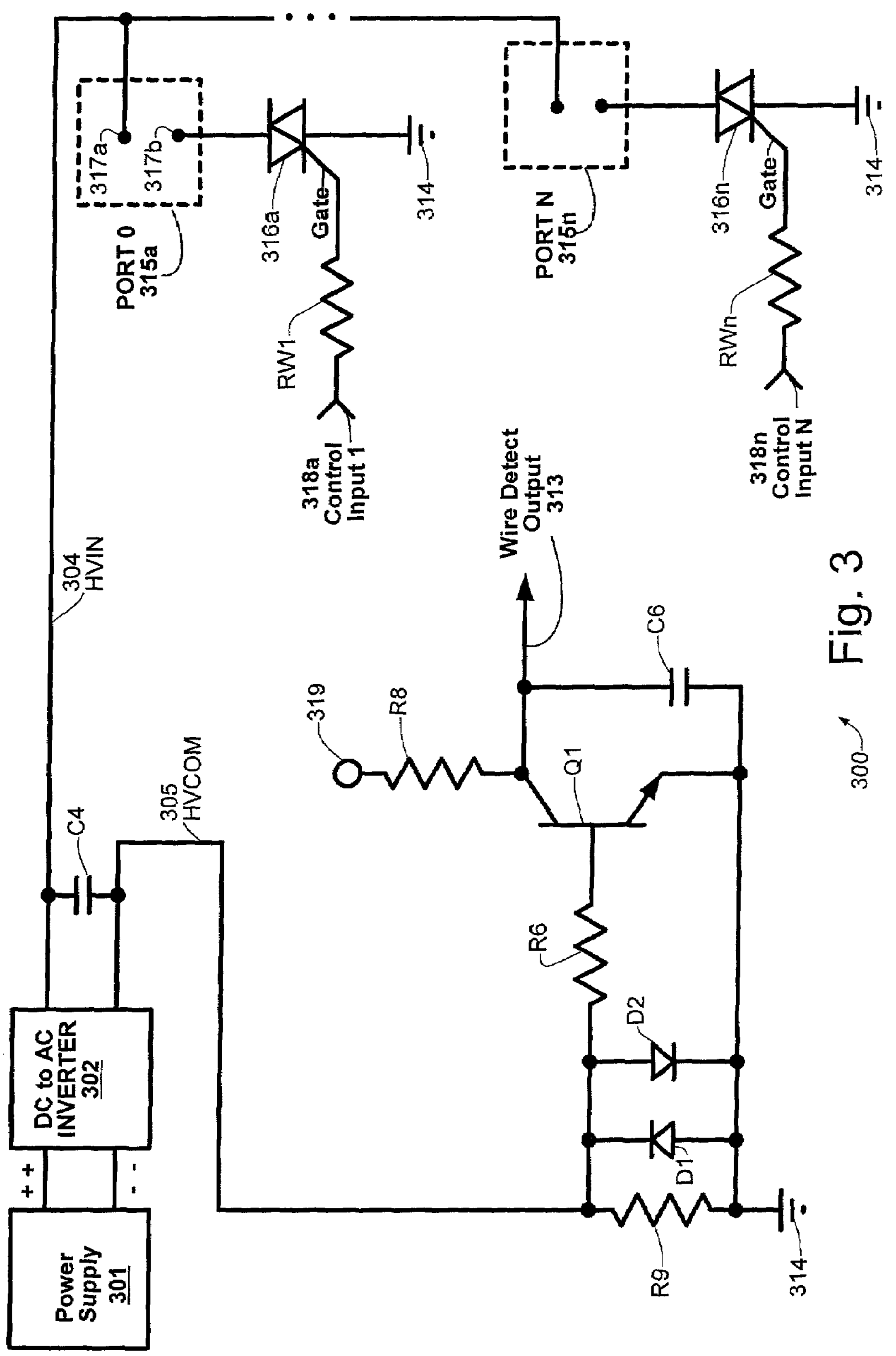
FIG. 3 shows a schematic diagram illustrating a specific embodiment of the active port detection device 300 of the present invention.

FIG. 3 shows a schematic diagram illustrating a specific embodiment of the active port detection device 300 of the present invention. According to specific embodiments, the active port detection technique of the present invention may be implemented upon the occurrence of a Power ON or Reset of the APD device, or at other times desired by the user. Once the identification of active ports has been accomplished, the APD device may then commence with sequencing and/or controlling the active ports according to a predetermined sequencing pattern.

According to a specific implementation, the technique of the present invention may be used to detect the presence of electroluminescent wire connected to one or more ports 315 (e.g. 315*a*, 315*n*) of circuit illustrated in FIG. 3. In the embodiment of FIG. 3, the circuit 300 is supplied with an AC voltage via a DC to AC inverter (302). One output terminal of this inverter is connected to input line HVIN 304. The other output terminal of the inverter is connected to a common line HVCOM 305. The name HVCOM refers to the fact that current flowing through any wire has a common path to ground (314) via line 305, and that, according to a specific embodiment, the current flowing through any port may be detected along this path.

As shown in the embodiment of FIG. 3, the APD device 300 includes a plurality of ports 315 (e.g. 315*a*, 315*n*). Each of the ports 315 is configured to include one or more receptacles or sockets. In the embodiment of FIG. 3, each port is configured to include a receptacle having to connectors (e.g. 317*a*, 317*b*). One of the connectors (e.g. 317*a*) is electrically coupled to the HVIN line 304, and the other connector (e.g. 317*b*) is electrically coupled to a respective TRIAC 316 (e.g. 316*a*, 316*n*) which provides an electrical path for allowing current to flow from the port to ground 314. When an electrical connection is made between connectors 317*a* and 317*b*, AC current may then flow from HVIN, through the electrical connection, and back to ground (314).

According to a specific embodiment, in order to implement active port detection, an input signal may be applied to a selected control input line, such as, for example, Control Input Line 1 (318*a*). According to one implementation, the voltage of the input signal should preferably be sufficient to cause the TRIAC 316*a* to latch. In a specific implementation, the TRIAC may be configured to latch at 5 mA of positive current flowing from power source 301 into the TRIAC through the resistor RW1. According to a specific embodiment, the input signal may be applied to one TRIAC at a given instant. Each TRIAC (316) in the circuit, in turn, is given a turn-on signal in order to test whether its associated port is active or inactive. According to a specific implementation, active port detection may be implemented initially upon the occurrence of a POWER ON or RESET operation.

The sensing of the presence or absence of an external load (e.g. external element, component, circuit, etc.) connected to a particular port is commenced after the input signal is applied to its associated TRIAC. Sensing may be performed for each port (315*a–n*) by a sensing device, such as, for example, the Active Port Detection Circuit 130 of FIG. 1. In one implementation, the sensing device may be configured to sense the current returning to ground (314) that is flowing through the load, which is connected to the port (315*a*) that the TRIAC (316*a*) controls. In this way, the sensing device is able to detect a capacitive load across the connectors (e.g. 317*a*, 317*b*) of the port. Additionally, using this technique, the sensing device is also able to detect a resistive load and/or an inductive load across the connectors (e.g. 317*a*, 317*b*) of the port.

Current flowing through HV COM (305) to and from ground (314) produces a voltage across R9, D1, and D2. Given the fact that there is a slight capacitive coupling of current between the terminals of a socket even with no wire plugged in, a false-detect can occur if this leakage current is not given a sufficient path to prevent the turning on of the detect-transistor (Q1).

For example, if R9 did not exist, then D1 and D2 would produce +/−0.7V of potential between HVCOM (305) and Ground (314). A +0.7 V potential with regards to ground is sufficient to switch Q1 on, initiating a wire-detect, which condition is described below. By selecting R9 so that the leakage current produces much less than 0.7 V of potential via the relation (R=I/V), false wire-detects are thus prevented by the component R9. In a specific implementation, the value of R9 is 470 Ohms.

Diodes D1 and D2 prevent the voltage between HVCOM (305) and Ground (314) from going outside of the range +/−0.7V. This prevents the active port detection circuit from dissipating a significant portion of the power produced by the inverter. For example, with an RMS voltage of 100V AC produced by the inverter, the 0.7V drop across D1 and D2 is 0.7V/100V*100 percent=0.7 percent of the inverter power. Without the diodes, perhaps several volts would be present between HVCOM and Ground, leading to a several percent loss in power that is not delivered to the port being tested, and hence the load.

When an element is connected to a selected port (e.g. 315*a*) and the TRIAC (316*a*) for that port is switched on, the current flow into HVCOM (305) produces a voltage with respect to Ground (314) sufficient to switch Q1 on during the positive part of the current cycle or wave supplied by the inverter (302). This, in turn, causes C6 to be discharged to close to zero volts (0 to 0.2V). During the negative part of the current cycle of the inverter (302), C6 charges back toward 5V (180) because Q1 is now turned off and the capacitor only supplied with current from R8. However, C6 is reset to zero volts before it can rise to a logical 1 (e.g. logical 1=1 volt, reset occurs at about 0.5 volt) by the next positive portion of the current wave. If the capacitor C6 were not present, the wire output detect voltage at 313 would instantaneously go back to 5V, falsely indicating that no wire is present. According to a specific embodiment, the presence of a wire at the port is sensed by a logical zero (0 to 0.2V with respect to ground) at the wire detect terminal 313.

The absence of a wire is detected by waiting a sufficient amount of time (e.g. 1 ms, 2 wave cycles) for C6 to be charged up to or past a logical 1 (1.0V or greater with regards to ground 314), and hence for the wire-detect output 313 to be at a logical 1. Note that this time should preferably be greater than a half-wave cycle lest a previous wire-detect left capacitor C6 discharged and it has not charged up to a logical 1 yet. Thus, according to a specific embodiment, 2 or more wave cycles of delay occurs between the turning on of a control signal at 318 and the checking of the Wire Detect output at 313.

According to a specific implementation, the various complements of the circuit illustrated in FIG. 3 may have the following corresponding values:

| Reference ID | Description | Example Value(s)/Types |
|---|---|---|
| C4 | capacitor | 0.0068 uF, 600 V |
| R9 | resistor | 470 Ohms |
| D1 | diode | 1N4007 |
| D2 | diode | 1N4007 |
| R6 | resistor | 1K |
| Q1 | transistor | 2N2222 |
| R8 | resistor | 10K |
| C6 | capacitor | 0.1 uF |
| 316a | TRIAC | Z01017 |
| 316n | TRIAC | Z01017 |
| RW1 | resistor | 1K |
| RWn | resistor | 1K |

Figure 4:
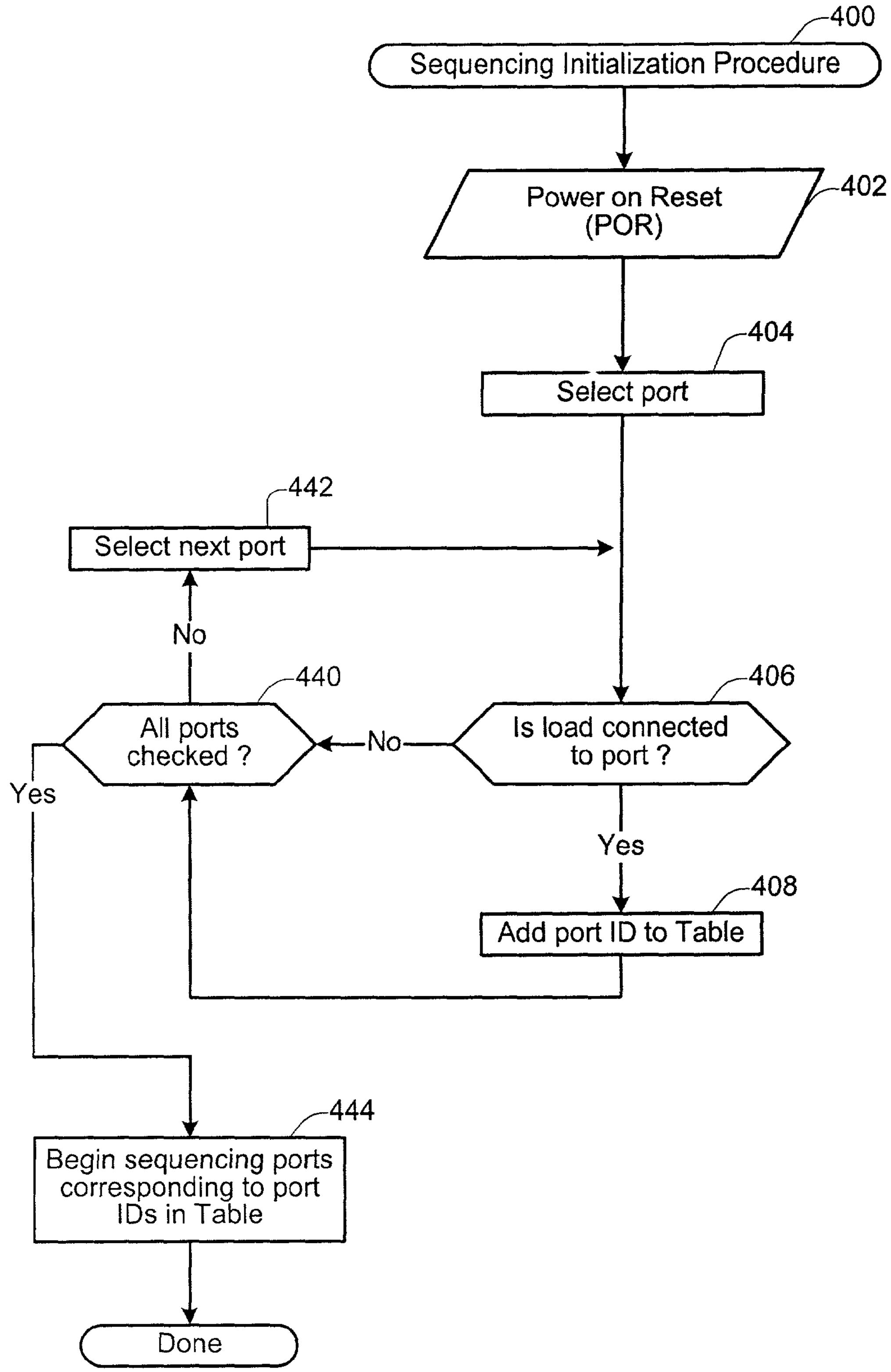
FIG. 4 shows a flow diagram of a Sequencing Initialization Procedure 400 in accordance with a specific embodiment of the present invention.
Figure 5:
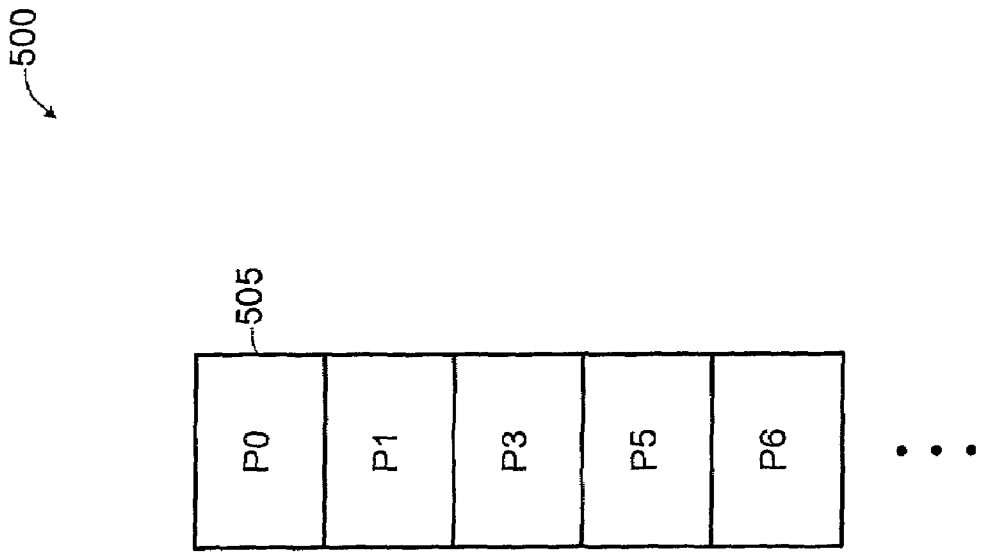
FIG. 5 shows an example of an Active Port Table 500 in accordance with a specific embodiment of the present invention.

FIG. 4 shows a flow diagram of a Sequencing Initialization Procedure 400 in accordance with a specific embodiment of the present invention. The Sequencing Initialization Procedure may be implemented in a variety of manners. For example, in the embodiment of FIG. 4, at power on or reset (402) the device selects (404) a first port for detection of wire presence, and determines (406) whether a wire is connected to the port using, for example, the wire detection circuit described previously with respect to FIGS. 1–3. If the circuit determines that a wire is connected, the appropriate port ID is added (408) to a table, such as, for example, the table 500 of FIG. 5. Thereafter, or if no wire is detected on the selected port, a determination is made (440) as to whether all of the ports of the device (e.g. sequencer unit) have been checked. If there are ports that have not been checked, the next port is selected (442), and the procedure returns to block 406 wherein the newly selected port is checked for the presence of a wire connected to the port. Once all ports have been checked, the port table has been completed, and sequencing of selected ports may then commence (414), wherein the selected ports correspond to the port IDs in table 500 (FIG. 5).

One advantage of this invention is that the device can automatically sequence through patterns appropriate for the number of wires connected.

One other embodiment of this flow chart is to return to the wire detect procedure at periodic intervals to maintain a continuous sequence in the event of dynamic hardware failure or alteration. For example, wires could be added or removed, these changes automatically detected, and then the sequence patterns automatically adjusted. Conversely, in the first manifestation, after the table 500 has been constructed, active wires can be removed to create new patterns with blank or "dark" spaces.

Zero-Crossing Detection

The present inventive entity currently produces several produces which switch electroluminescent wire on at a speeds of 30–100 Hz. Electroluminescent wire (distributed under the tradename Coolneon™ by Funhouse Productions, of Oakland, Calif.) is generally known to one having ordinary skill in the art, and is described in greater detail in U.S. Pat. No. 5,869,930, to Baumberg, et. al, and entitled "Electroluminescent Light Source With A Mixture Layer Filled With A Transparent Filler Substance", and U.S. Pat. No. 5,485,355, to Voskoboinik, et al., and entitled, "Electroluminescent Light Sources", the disclosures of which are herein incorporated by reference in their entirety for all purposes.

It has been determined that when the load (e.g. electroluminescent wire) is switched sufficiently fast by an inverter (e.g. greater than 10 times per second), the inverter oscillation will periodically attenuate suddenly to 0 VRMS. The inverters recover from this situation and begin oscillating anew after at least 10–20 mS, sometimes more. This time period of 10–20 mS when the inverter is at 0VRMS means that the wire being powered by the inverter perceptibly dims or flickers. This is percieved as 'wrong' or 'irritating' to a user who is expecting a regular pattern, and is especially enoticable when an inverter is being switched, for example, at 30–60 Hz.

The present inventive entity has discovered that when a TRIAC turns on a wire when the inverter is not moving towards 0V, attenuation of its oscillation may occur.

It has also been discovered that when a TRIAC is turned on just before the zero-crossing of the current wave (corresponding to the AC current flowing through the wire), that an inverter will not die-down to 0VRMS, but rather will continue oscillating normally.

According to a specific embodiment, the wire-detection circuit of FIGS. 1 and 2 may be modified in the following way so that it not only detects a wire, but also provides zero-crossing information to the device that the wire-detect output goes to.

Figure 6:
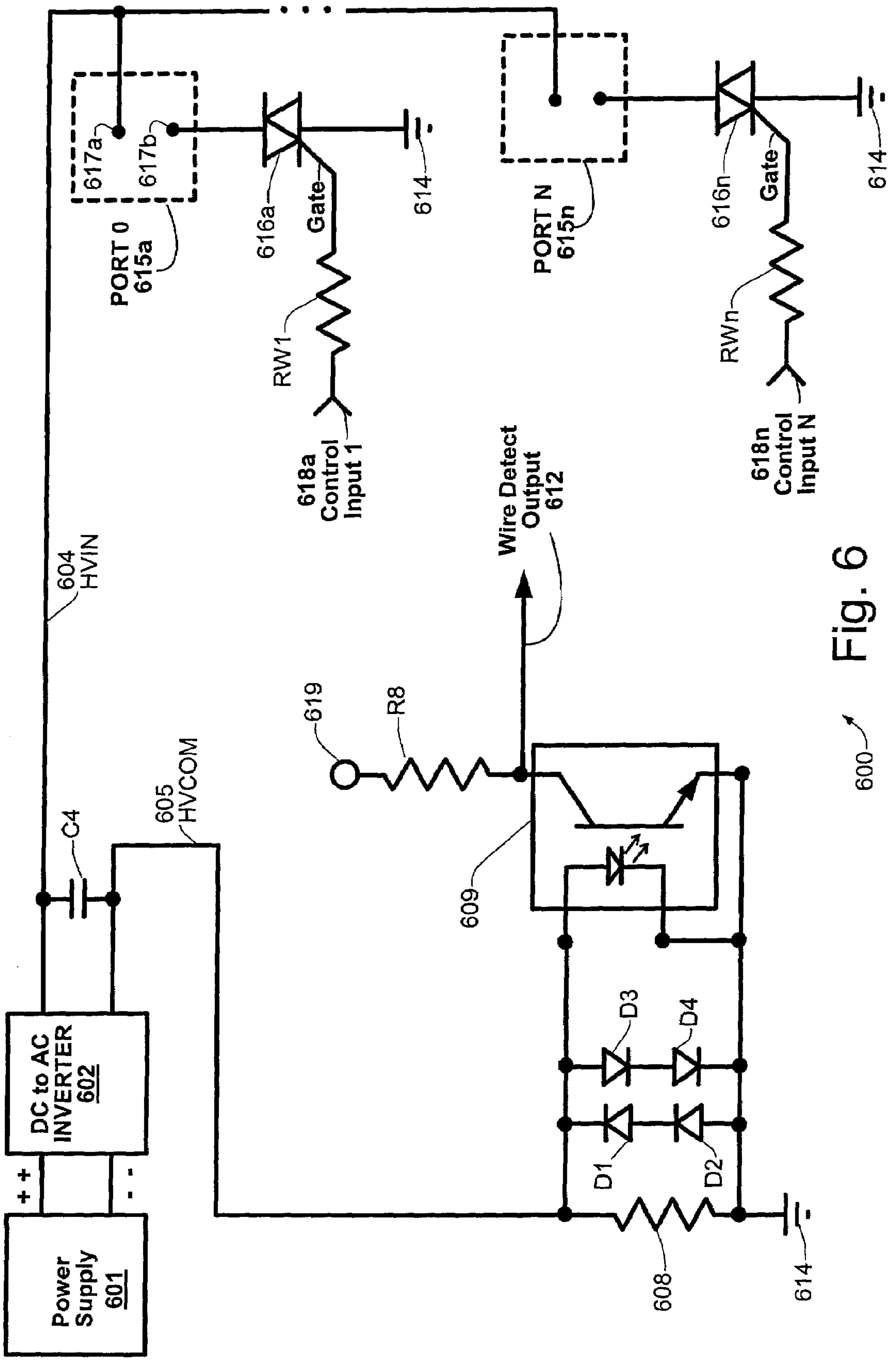
FIG. 6 shows an example of an alternate implementation of the wire-detect circuit of FIG. 2A.

FIG. 6 shows an example of an alternate implementation of the wire-detect circuit of FIG. 2A. As shown in FIG. 6, an optoisolator (609) is used to detect current flow. Additionally, there are four diodes instead of two. This is because the optoisolator's photo L.E.D. turn on voltage is around 1.4V, or 2 diode voltage drops, whereas the sequencer circuit of FIG. 2A utilizes a normal transistor which turns on at approximately one diode voltage drop. The optoisolator 609 frees up the circuit to sense current off the HV Supply or HV Return, it does not matter which.

Referring to FIG. 6, when no wire is plugged into any port, a slight leakage current will still flow through the diodes D1 (604), D2 (605), D3 (606) and D4 (607). R1 (608) is selected by the relation R<<V/I, where V=turn on voltage of photodiode of the optoisolator (609), and I=maximum leakage current. In this way, false-detects are prevented, the same as in FIG. 2. According to a specific implementation, the value of R1 is 470 ohms.

One change to the wire-sense circuit of FIG. 6 is that the charge capacitor of FIG. 2A has been removed from the circuit. The circuit may be the same in all other aspects. The change is in the interpretation of the voltage levels at the Wire Detect Output (612):

When the Wire Detect Output (612) stays at 5Volts for greater than or equal to one wave-cycle after an attempt is made to turn on a wire, there is no wire plugged into the port for that wire. If, however, the Wire Detect Output is a Square Wave (of 1 wave cycle in duration) swinging, for example, from 0V to 5V, then a wire is detected. In addition, for example, the square-wave gives information about when the zero-current-crossing occurs. By timing the zero crossing of a wire, the next wire can be switched on and the current wire off just before (1–5% of phase before) the actual zero-crossing event occurs. This has been determined to remove inverter die-down (attenuation of inverter oscillation to approximately 0Vrms).

When a wire is present and under control (i.e., the TRIAC (616*a*) controlling it is turned on via a control signal (618*a*)), the photodiode of the optoisolator (609) is excited when the voltage wave of HVSUPPLY is greater than 1.5V, causing the phototransistor of the optoisolator to turn on, bringing the output of the transistor to 0V (612). When the HVSUPPLY voltage swings back to less than 1.5V, the photodiode and phototransistor both turn off, causing the Wire-detect output (612) to discurse back to 5.0V. By sensing these transitions, zero-crossing information is obtained by the same facility that is used to detect wires.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A method for operating a sequencer, the sequencer including a plurality of ports including a first port, the method comprising:

performing automatic active port detection on a first portion of the plurality of ports;

automatically identifying the first port as an active port in response to a determination that an external component is connected to the first port;

automatically identifying the first port as an inactive port in response to a determination that no external component is connected to the first port; and sequencing only a selected portion of ports of the sequencer which have been identified as active ports;

wherein the sequencing of a selected active port includes distributing power to the selected active port during a first time interval, and preventing distribution of power to the selected active port during a second time interval.

2. The method of claim 1 wherein said automatic determining includes detecting for a presence of a current flowing through the first port during a third time interval; and identifying the first port as an active port in response to a determination that a current is flowing through the first port during the third time interval.

3. The method of claim 1 wherein the first port is not operable to communicate with the external component using a data communication protocol.

4. The method of claim 1 wherein the first port is devoid of a data communication interface for facilitating transmission of data from the sequencer to the external component.

5. The method of claim 1 wherein the sequencing of the selected active port is performed without transmitting data to the selected active port using a data communication protocol.

6. The method of claim 1 wherein said sequencing includes distributing only power to selected active ports according to a predefined pattern.

7. The method of claim 1 wherein the external component includes a length of electrolumiscent wire.

8. The method of claim 1 wherein the external component includes a light emitting diode.

9. A computer program product, the computer program product including a computer usable medium having computer readable code embodied therein, the computer readable code comprising computer code for implementing the method of claim 1.

10. A method for sequencing selected ports of an electronic device, the electronic device including a first port and a second port, the method comprising:

performing automatic active port detection on at least one of the selected ports in order to identify at least one active port of the electronic device;

wherein said active port detection includes automatically determining whether an external load is connected to at least one of the selected ports; and sequencing only a selected portion of ports of the electronic device which have been identified as active ports;

wherein the sequencing of a selected active port includes distributing power to the selected active port during a first time interval, and preventing distribution of power to the selected active port during a second time interval.

11. The method of claim 10 further comprising:

automatically identifying at least one non-active port of the electronic device;

wherein a non-active port is characterized by a port which is not electrically connected to an external load; and ignoring non-active ports in sequencing operations performed by the electronic device.

12. The method of claim 10 wherein the external load includes at least one of: a capacitive load, a resistive load, and an inductive load.

13. The method of claim 10 wherein said automatic determining includes automatically detecting for a presence of a current flowing through a first port; and identifying the first port as an active port in response to a determination that a current is flowing through the first port.

14. The method of claim 10 wherein the selected active port is not operable to communicate with the external component using a data communication protocol.

15. The method of claim 10 wherein the selected active port is devoid of a data communication interface for facilitating transmission of data from the electronic device to the external load.

16. The method of claim 10 wherein the sequencing of the selected active port is performed without transmitting data to the selected active port using a data communication protocol.

17. The method of claim 10 wherein said sequencing includes distributing only power to selected active ports according to a predefined pattern.

18. The method of claim 10 wherein the external load includes a length of electrolumiscent wire.

19. The method of claim 10 wherein the external load includes a light emitting diode.

20. A computer program product, the computer program product including a computer usable medium having computer readable code embodied therein, the computer readable code comprising computer code for implementing the method of claim 10.

21. A sequencer comprising:

a plurality of ports including a first port;

at least one processor; and memory;

the sequencer being operable to perform automatic active port detection on a first portion of the plurality of ports;

the sequencer being further operable to automatically identify the first port as an active port in response to a determination that an external component is connected to the first port;

the sequencer being further operable to automatically identify the first port as an inactive port in response to a determination that no external component is connected to the first port; and the sequencer being further operable to sequence only a first portion of ports of the sequencer which have been identified as active ports;

wherein the sequencing of a selected active port includes distributing power to the selected active port during a first time interval, and preventing distribution of power to the selected active port during a second time interval.

22. The sequencer of claim 21 being further operable to:

detect for a presence of a current flowing through the first port during a third time interval; and identify the first port as an active port in response to a determination that a current is flowing through the first port during the third time interval.

23. The sequencer of claim 21 wherein the first port is not operable to communicate with the external component using a data communication protocol.

24. The sequencer of claim 21 wherein the first port is devoid of a data communication interface for facilitating transmission of data from the sequencer to the external component.

25. The sequencer of claim 21 being further operable to perform sequencing of the selected active port without transmitting data to the selected active port using a data communication protocol.

26. The sequencer of claim 21 wherein said sequencing includes distributing only power to selected active ports according to a predefined pattern.

27. The sequencer of claim 21 wherein the external component includes a length of electrolumiscent wire.

28. The sequencer of claim 21 wherein the external component includes a light emitting diode.

29. A sequencing system comprising:

a plurality of ports;

at least one processor;

memory;

the sequencing system being operable to perform automatic active port detection on at least one of the selected ports in order to identify at least one active port of the electronic device;

wherein said active port detection includes automatically determining whether an external load is connected to at least one of the selected ports; and the sequencing system being operable to sequence only a selected portion of ports of the electronic device which have been identified as active ports;

wherein the sequencing of a selected active port includes distributing power to the selected active port during a first time interval, and preventing distribution of power to the selected active port during a second time interval.

30. The sequencing system of claim 29 further comprising:

means for automatically identifying at least one non-active port of the electronic device;

wherein a non-active port is characterized by a port which is not electrically connected to an external load; and means for ignoring non-active ports in sequencing operations performed by the electronic device.

31. The sequencing system of claim 29 wherein the external load includes at least one of: a capacitive load, a resistive load, and an inductive load.

32. The sequencing system of claim 29 further comprising:

means for automatically detecting for a presence of a current flowing trough a first port; and means for identifying the first port as an active port in response to a determination that a current is flowing through the first port.

33. The sequencing system of claim 29 wherein the selected active port is not operable to communicate with the external component using a data communication protocol.

34. The sequencing system of claim 29 wherein the selected active port is devoid of a data communication interface for facilitating transmission of data from the selected active port to the external load.

35. The sequencing system of claim 29 wherein the sequencing of the selected active port is performed without transmitting data to the selected active port using a data communication protocol.

36. The sequencing system of claim 29 wherein said sequencing includes distributing only power to selected active ports according to a predefined pattern.

37. The sequencing system of claim 29 wherein the external load includes a length of electrolumiscent wire.

38. The sequencing system of claim 29 wherein the external load includes a light emitting diode.

* * * * *